United States Patent
Kakisaka et al.

(10) Patent No.: US 7,632,210 B2
(45) Date of Patent: Dec. 15, 2009

(54) DEVICE AND METHOD FOR CONTROLLING AN AUTOMATIC TRANSMISSION

(75) Inventors: Naotaka Kakisaka, Tokyo-to (JP); Mitsuharu Ito, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 231 days.

(21) Appl. No.: 11/889,069

(22) Filed: Aug. 8, 2007

(65) Prior Publication Data

US 2008/0058156 A1   Mar. 6, 2008

(30) Foreign Application Priority Data

Sep. 5, 2006   (JP) ............... 2006-240484

(51) Int. Cl.
  B60W 10/00 (2006.01)
  F16H 61/00 (2006.01)
  F16H 31/00 (2006.01)
(52) U.S. Cl. ............ 477/70; 477/71; 477/116; 477/94; 475/116; 475/120
(58) Field of Classification Search ............. 477/70, 477/116, 174, 71, 94; 475/116, 120
See application file for complete search history.

(56) References Cited

U.S. PATENT DOCUMENTS

| 7,044,890 | B2 * | 5/2006 | Kojima et al. | 477/175 |
| 7,089,095 | B2 * | 8/2006 | Takami et al. | 701/22 |
| 7,134,538 | B2 * | 11/2006 | Hasegawa et al. | 192/220.1 |
| 7,149,616 | B2 * | 12/2006 | Matsubara et al. | 701/51 |
| 2004/0204290 | A1 * | 10/2004 | Ito | 477/175 |

FOREIGN PATENT DOCUMENTS

| JP | A 01-229145 | 9/1989 |
| JP | A 09-049565 | 2/1997 |
| JP | A 09-152031 | 6/1997 |
| JP | A 09-301141 | 11/1997 |
| JP | A 10-019116 | 1/1998 |
| JP | A 10-159959 | 6/1998 |
| JP | A 11-193866 | 7/1999 |
| JP | A-11-311326 | 11/1999 |
| JP | A 2000-310318 | 11/2000 |
| JP | A 2000-310319 | 11/2000 |
| JP | A 2002-122236 | 4/2002 |
| JP | A 2004-150531 | 5/2004 |
| JP | A 2004-183751 | 7/2004 |
| JP | A 2005-162007 | 6/2005 |
| JP | A 2006-161561 | 6/2006 |
| JP | A 2007-113608 | 5/2007 |
| JP | A 2008-008426 | 1/2008 |

* cited by examiner

*Primary Examiner*—Tisha D Lewis
(74) *Attorney, Agent, or Firm*—Oliff & Berridge, PLC (57) ABSTRACT

A control device for an automatic transmission includes: a control portion that executes a neutral control to release the friction engagement element if a progressing position of the automatic transmission is selected, and a state of the vehicle satisfies a certain condition; a detection portion that detects degree of deceleration of the vehicle before the neutral control is executed; and a releasing portion for releasing the friction engagement element to be in a released or semi-released state in accordance with a shift of the automatic transmission if the degree of deceleration is greater than a predetermined degree.

6 Claims, 6 Drawing Sheets

|      | C1 | C2 | B1 | B2 | B3 | F |
|------|----|----|----|----|----|----|
| 1ST  | ○  | ×  | ×  | ◎  | ×  | △ |
| 2ND  | ○  | ×  | ○  | ×  | ×  | × |
| 3RD  | ○  | ×  | ×  | ×  | ○  | × |
| 4TH  | ○  | ○  | ×  | ×  | ×  | × |
| 5TH  | ×  | ○  | ×  | ×  | ○  | × |
| 6TH  | ×  | ○  | ○  | ×  | ×  | × |
| R    | ×  | ×  | ×  | ○  | ○  | × |
| N    | ×  | ×  | ×  | ×  | ×  | × |

◎ OPERATED DUARING ENGINE BRAKING
△ OPERATED ONLY DUARING DRIVING

DEVICE AND METHOD FOR CONTROLLING AN AUTOMATIC TRANSMISSION

INCORPORATION BY REFERENCE

The disclosure of Japanese Patent Application No. JP2006-240484 filed on 5 Sep. 2006 including the specification, drawings and abstract is incorporated herein by reference in its entirety.

BACKGROUND OF THE INVENTION

1. Field of the Invention

The invention relates to a control device and a method for controlling an automatic transmission, which prevent causing discomfort to an occupant by a shock as a result of torsion energy that has been accumulated in a drive transmission system involved in a sharp braking, used specifically in a rear-wheel drive vehicle (FR type, that is, Front engine Rear drive type) that has a propeller shaft.

2. Description of the Related Art

An automatic transmission that is equipped with an electromagnetic valve and that receives an external electric signals from the components around and adjusts variables regarding gearshift operations, for example, gear step, oil pressure level, constant value and timing during shift operations, etc., through the use of an ECU (Electronic Control Unit), has been put into practical use. Due to the ECU, it is possible to reliably and promptly shift operational states of the automatic transmission to various states. Furthermore, because the ECU incorporates a CPU (Central Processing Unit), the automatic transmission may be controlled by programs. Therefore, by changing the programs or various constants, operational states of the automatic transmission may be precisely set. Hence, an ECU enables an automatic transmission to perform in optimum manners by corresponding to operational states of a vehicle and engine loads. It is to be noted herein that the operational states of a vehicle include vehicle speed, steering operation, frequency and level of acceleration/deceleration, state of road surface, etc. Furthermore, the engine loads include rotation speed of the engine, throttle opening degree, accelerator pedal depression amount, torques of the input and output shafts of the engine and an automatic transmission, etc.

Still further, levels of oil pressure supplied to friction engagement elements (clutches and brakes) provided within an automatic transmission are precisely adjusted in conformance with the operational states of a vehicle and the engine loads. Thus, the automatic transmission is able to restrain shock and reduce wear on the friction engagement elements, and therefore accomplishing shifting to be prompt and smoothened.

An automatic transmission constitutes a gear shift mechanism, that is linked to an engine via a torque converter or the like involves a plurality of power transmission paths. For example, an automatic transmission is constructed so as to automatically switch a power transmission path, that automatically switches the gear ratio, based on accelerator operation amount and a vehicle speed. A vehicle consists an automatic transmission is provided with a shift lever that sets the shift positions, for example, a reverse position, a neutral position, a progressing position, etc. by a driver. Of the shift positions set, the progressing position is usually selected to perform an automatic gear shift control.

In a vehicle consists an automatic transmission, while the vehicle is at a stop with a progressing position of the automatic transmission is set, a so called creep phenomenon occurs due to drive force from an engine in an idling state is transmitted via a torque converter to the transmission, and then is transmitted to wheels. A creep phenomenon, for example, allows a vehicle to smoothly start from a stop on an uphill road, and the like, and is therefore very useful under a certain condition. However, when the vehicle is kept at a stop, a creep phenomenon is unnecessary, and the creep force due to a creep phenomenon is suppressed by operating brakes of the vehicle. Thus, because the creep force due to a creep phenomenon caused by drive force from an engine is suppressed by brakes, the fuel consumption of an engine correspondingly declines, which is a problem of the aforementioned vehicle.

To overcome this problem, Japanese Patent Application Publication No. JP-A-2000-310318, Japanese Patent Application Publication No. JP-A-2000-310319, and Japanese Patent Application Publication No. JP-A-11-193866 disclose a neutral control in which while a vehicle is at a stop with a progressing position of an automatic transmission is selected, a brake pedal depressed and therefore the brakes engage, and an accelerator pedal being in a substantially non-operated state, a progressing clutch is released during the progressing position of the automatic transmission is kept, so that friction engagement elements are in a nearly neutral state, thereby attempting to improve the fuel consumption.

In an FR vehicle having a propeller shaft as a mechanical element in the drive transmission system, the drive force from the drive wheels (rear wheels) is added and therefore torsion energy is more likely to be accumulated in a drive transmission system.

During the vehicle is braking, the drive wheels drive the engine. The torsion energy that occurs is residual energy obtained by subtracting the amount of braking energy from the entire kinetic energy. This residual energy causes flexure in the drive transmission system. Since the drive transmission system and the engine are mechanically connected, the residual energy is accumulated as flexure in elastic members, such as rubber pieces and the like in the engine mount system, or the like. During braking of the vehicle, the engine mount system flexes, the power train (including the engine and the transmission) tends to move forward direction of the vehicle. Due to this, the coupling of the transmission and the propeller shaft become loose. However, the aforementioned coupling can instead become a pushed-in state depending on the mount supporting method and the construction of the power train or the drive train.

If the neutral control is executed when the coupling therebetween being loose as described above, the residual energy is released and emitted, so that the power train that has moved forward returns to the regular position. However, the coupling not always smoothly slides from the state of loose to the regular state of the coupling between the transmission and the propeller shaft. Conversely, if the splines of the transmission and the splines of the propeller shaft are meshed with each other, and are momentarily or partially anchor to each other, the residual energy is released all at once, instead of being gradually released as the splines of the transmission and the splines of the propeller shaft slide. As a result, a noise or a shock occurs to the vehicle.

As in the neutral control, normally an input clutch is released while the vehicle is at a complete stop with a brake pedal depressed. If there is residual energy accumulated in a drive transmission system during a braking operation preceding the neutral control, a shock occurs during the state of complete stop of the vehicle, irrespectively of a driver's operation, since the neutral control is started irrespectively of the driver's operation. In particular, the occurrence of a shock to the vehicle during a state where a driver has not done any operation is not preferable.

However, this problem is not mentioned in any of the foregoing related-arts. Furthermore, the attempt to solve the problem by providing a flexible coupling as an interference member in the drive transmission system or by treating the surface of the sliding portions of the coupling portions to dramatically reduce friction coefficient result in increased cost. If the neutral control of the transmission at the time of stop of the vehicle is prohibited, the problem of the shock may be avoided, but the effect of improving fuel consumption cannot be attained.

SUMMARY OF THE INVENTION

The invention provides a control device and method for an automatic transmission, which executes a neutral control without causing an occupant of a vehicle to perceive a shock that results from torsion energy accumulated in the drive transmission system during braking of the vehicle.

A first aspect of the invention relates to a control device for an automatic transmission having a friction engagement element that is engaged and released to switch a state of power between an engine and a drive wheel that are mounted in a vehicle, between a transmitted state and a non-transmitted state. The control device includes:

a control portion that executes a neutral control to release the friction engagement element if a progressing position of the automatic transmission is selected and a state of the vehicle satisfies a certain condition;

a detection portion that detects degree of deceleration of the vehicle before the neutral control is executed; and a releasing portion that releases the friction engagement element to be in a released or semi-released state in accordance with a shift of the automatic transmission if the degree of deceleration is greater than a predetermined degree.

According to the foregoing aspect, if the degree of deceleration of the vehicle is greater than the predetermined degree, the control portion releases the friction engagement element to be in the released or semi-released state according to the shift of the automatic transmission. At least, in the case where the accumulated torsion energy may be released during gear shift, the friction engagement element is released to be in the neutral state (hereinafter, the neutral state refers to a released or semi-released state of the friction engagement element) simultaneous to the shift, or the friction engagement element is released to be in the neutral state between shifts. Ordinarily, during a gear shift of an automatic transmission, the automatic transmission performs a smooth shift without interrupting the torque transmission. Although a control device of the automatic transmission releases torsion energy simultaneous to a shift or between shifts, a shock may be caused as described above, since the vehicle is moving, a shock is not perceived by an occupant of the vehicle. Furthermore, since the control device of the automatic transmission promptly executes the neutral control after the vehicle stops, the fuel consumption is improved. As a result, the control device of the automatic transmission executes the neutral control without causing an occupant of the vehicle to perceive a shock that results from torsion energy accumulated in the drive transmission system during braking, and therefore the fuel consumption is improved.

A second aspect of the invention relates to a control method for an automatic transmission having a friction engagement element that is engaged and released to switch a state of power between an engine and a drive wheel that are mounted in a vehicle, between a transmitted state and a non-transmitted state. The control method includes:

releasing the friction engagement element if with a progressing position of the automatic transmission is selected and a state of the vehicle satisfies a certain condition;

detecting degree of deceleration of the vehicle before the friction engagement element is released; and releasing the friction engagement element to be in a released or semi-released state in accordance with a shift of the automatic transmission if the degree of deceleration is greater than a predetermined degree.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Hereinafter, embodiments of the invention are described related to the diagrams. In the description below, the terms "braking" and "deceleration" are used basically in the same meaning. That is, deceleration in the description below results from braking.

Figure 1:
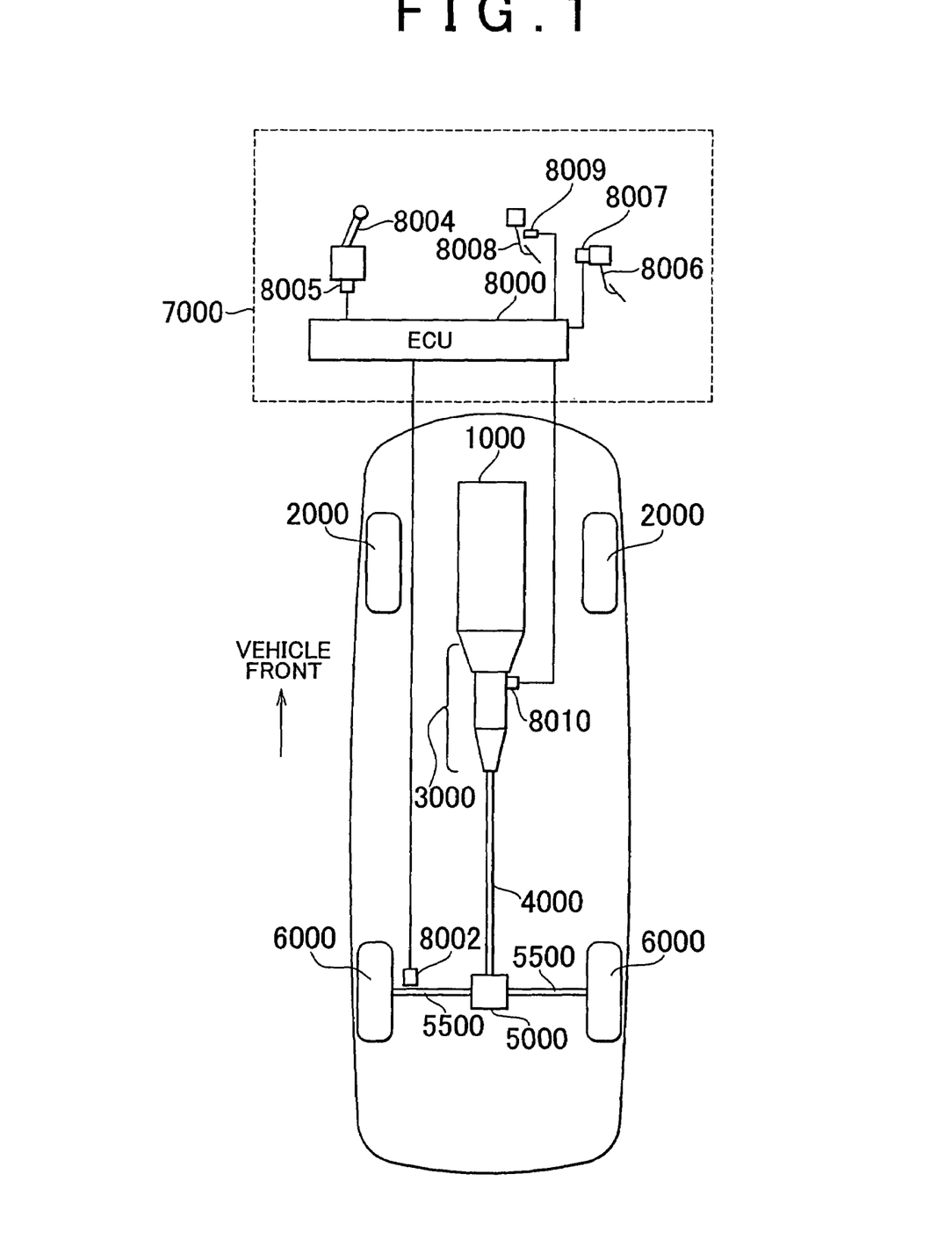
FIG. 1 is an overall construction diagram of the vehicle, including the control device of the automatic transmission in accordance with the first embodiment of the invention.

As described in the first embodiment, a vehicle is equipped with a control device for a stepped automatic transmission, as shown in FIG. 1. The vehicle above is an FR vehicle having a propeller shaft. In addition, the automatic transmission in a vehicle equipped with a control device for an automatic transmission in accordance with this embodiment may also be a step-less automatic transmission instead of the stepped automatic transmission. Furthermore, the description below does not actively exclude an FF (front engine, front drive) vehicle, or a four-wheel drive vehicle (4WD).

The vehicle of the embodiment includes an engine 1000, front wheels 2000 which are the idler wheels and also steering wheels, a transmission 3000, a propeller shaft 4000, a differential gear 5000, rear wheels 6000 which are the drive wheels, and a control portion 7000 consists an ECU 8000 as the main component.

The engine 1000 is an internal combustion engine in which a mixture of fuel injected from an injector that is not shown in the drawings and air are burned in a combustion chamber of a cylinder that is not shown in the drawings. Due to the combustion of the mixture, a piston in the cylinder is pushed down to rotate a crankshaft.

The transmission 3000 changes the rotational speed of the crankshaft to a desired rotational speed by shifting to a desired gear step. An output gear of the transmission 3000 is connected to the differential gear 5000 via the propeller shaft 4000. A torque converter 3001 and a planetary gear unit 3002 constituting the transmission 3000 will be described later in detail.

Drive shafts 5500 are connected to the differential gear 5000 that transmits drive force to the rear wheels 6000. The drive force is transferred to the left and right rear wheels 6000 via the drive shafts 5500. Incidentally, splines are used in the connection between the transmission 3000 and the propeller shaft 4000, the connection between the propeller shaft 4000 and the differential gear 5000, and the connection between the differential gear 5000 and the drive shafts 5500.

Connected to the ECU 8000 via a harness are a vehicle speed sensor 8002, a shift position sensor 8005 of a shift lever 8004, an accelerator operation amount sensor 8007 of an accelerator pedal 8006, a break light switch 8009 provided at a brake pedal 8008, and an oil temperature sensor 8010 for detecting temperature of working oil of the transmission 3000.

The vehicle speed sensor 8002 detects the vehicle speed from the rotational speed of the drive shafts 5500, and sends the signal to the ECU 8000. The position of the shift lever 8004 is detected by the shift position sensor 8005, and the signal is sent to the ECU 8000. Corresponding to the position of the shift lever 8004, a gear step of the transmission 3000 is automatically formed. It is also allowable for the shift lever 8004 to select a manual mode in which a driver may select any gear step in accordance with a driver's operation.

The accelerator operation amount sensor 8007 detects the degree of depression of the accelerator pedal 8006, and sends the signal to the ECU 8000. The break light switch 8009 detects an on/off state of the brake pedal 8008, and sends a signal to the ECU 8000. Instead of the break light switch 8009, a stroke sensor that detects the amount of stroke of the brake pedal 8008 may be provided. The oil temperature sensor 8010 detects the temperature of the ATF (Automatic Transmission Fluid) of the transmission 3000, and sends a signal to the ECU 8000.

Based on the signals from the vehicle speed sensor 8002, the shift position sensor 8005, the accelerator operation amount sensor 8007, the break light switch 8009, the oil temperature sensor 8010, etc., a ROM (Read-Only Memory) which stores maps and programs, the ECU 8000 controls a hydraulic circuit of the transmission 3000 so that even if torsion energy accumulated in the drive transmission system during deceleration is released all at once, shock perceived to an occupant of the vehicle is prevented due to the sudden disengagement of the firm contact in a spline.

Figure 2:
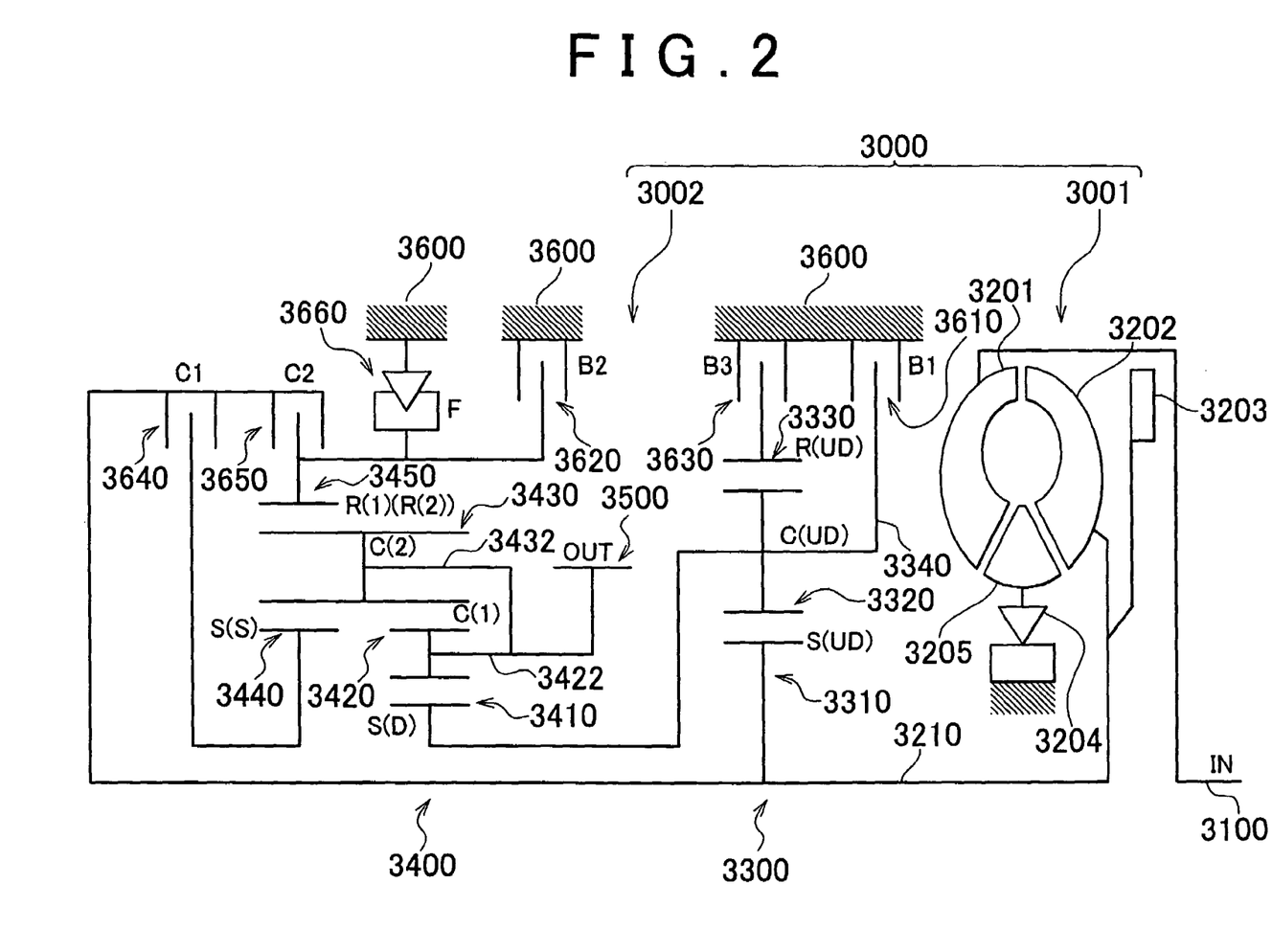
FIG. 2 is a view schematically showing a planetary gear unit.

Referring to FIG. 2, the transmission 3000 is described. The transmission 3000 is mainly constructed from the torque converter 3001 and the planetary gear unit 3002. This transmission 3000 is a six-gear-shift automatic transmission. Although the controlled object of the control device in accordance with the embodiments of the invention is not limited to a six-gear-shift automatic transmission.

The planetary gear unit 3002 is connected to the torque converter 3001, which has an input shaft 3100 that is connected to the crankshaft. The planetary gear unit 3002 includes a first set 3300 of a planetary gear mechanism, a second set 3400 of a planetary gear mechanism, an output gear 3500, and a B1 brake 3610, a B2 brake 3620 and a B3 brake 3630 that are fixed to a gear case 3600 as well as a C1 clutch 3640, a C2 clutch 3650, and a one-way clutch F 3660.

The first set 3300 is a single-pinion type planetary gear mechanism. The first set 3300 includes a sun gear S(UD) 3310, pinion gears 3320, a ring gear R(UD) 3330, and a carrier C(UD) 3340.

The sun gear S(UD) 3310 is linked to an output shaft 3210 of the torque converter 3001. The pinion gears 3320 are rotatably supported by the carrier C(UD) 3340. The pinion gears 3320 are engaged with the sun gear S(UD) 3310 and the ring gear R(UD) 3330.

The ring gear R(UD) 3330 is fixed to the gear case 3600 by the B3 brake 3630. The carrier C(UD) 3340 is fixed to the gear case 3600 by the B1 brake 3610.

The second set 3400 is a Ravigneaux type planetary gear mechanism. The second set 3400 includes a sun gear S(D) 3410, short pinion gears 3420, a carrier C(1) 3422, long pinion gears 3430, a carrier C(2) 3432, a sun gear S(S) 3440, and a ring gear R(1) (R(2)) 3450.

The sun gear S(D) 3410 is linked to the carrier C(UD) 3340. The short pinion gears 3420 are rotatably supported by the carrier C(1) 3422. The short pinion gears 3420 are engaged with the sun gear S(D) 3410 and the long pinion gears 3430. The carrier C(1) 3422 is linked to the output gear 3500.

The long pinion gears 3430 are rotatably supported by the carrier C(2) 3432. The long pinion gears 3430 are engaged with the short pinion gears 3420, the sun gear S(S) 3440 and the ring gear R(1) (R(2)) 3450. The carrier C(2) 3432 is linked to the output gear 3500.

The sun gear S(S) 3440 is linked to the output shaft 3210 of the torque converter 3001 by the C1 clutch 3640. The ring gear R(1) (R(2)) 3450 is fixed to the gear case 3600 by the B2 brake 3620, and is linked to the output shaft 3210 of the torque converter 3001 by the C2 clutch 3650. Furthermore, the ring gear R(1) (R(2)) 3450 is linked to the one-way clutch F 3660, and is made unrotatable at the time of driving in the first-gear step (1ST).

Figure 3:
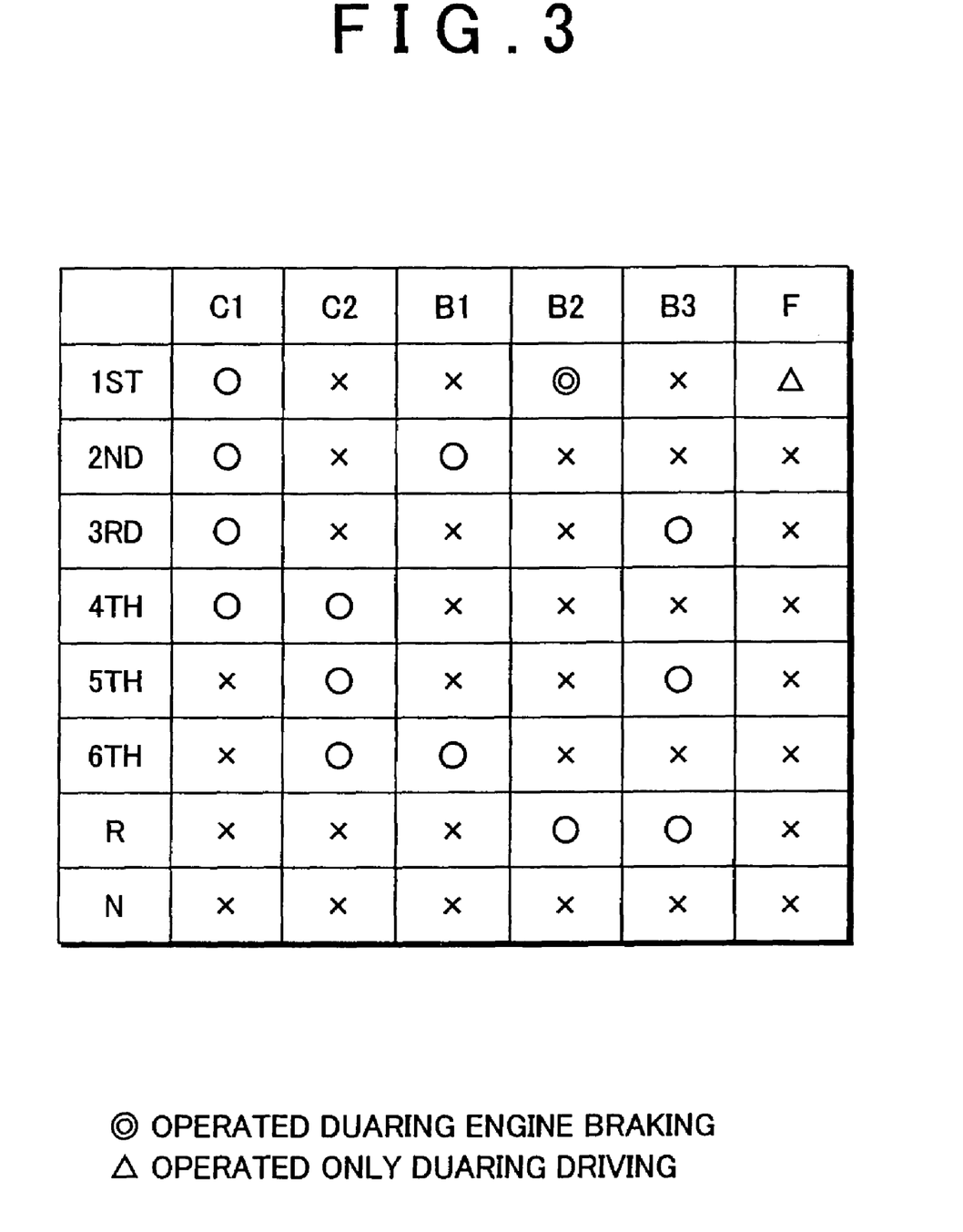
FIG. 3 is an operation table that represents the correspondence between various gear steps and various brakes and clutches.

FIG. 3 shows an operation table that represents a relationship between the various gear steps and the clutches and brakes of the transmission 3000. In the table, a circle represents engagement. Likewise, "X" represents release. a double circle represents the engagement that is made during the use of engine brake. A triangle represents the engagement that is made only during driving. By operating the brakes and the clutches in the combinations shown in the operation table, the first (1ST) to sixth (6TH) gear steps and one reverse gear step (R) may be formed.

Because the transmission 3000 is provided with the one-way clutch F 3660 in parallel with the B2 brake 3620, as a double circle shown in the operation table, the B2 brake 3620 is unnecessary to be engaged when forming the first-gear step (1ST) that is driven by the engine (the time of acceleration). In this embodiment, the one-way clutch F 3660 prevents rotation of the ring gear R(1) (R(2)) 3450 during driving in the first-gear step (1ST). During the engine brake is being used, the one-way clutch F 3660 does not prevent rotation of the ring gear R(1) (R(2)) 3450.

The torque converter 3001 includes a lockup clutch 3203 that directly couples the input shaft 3100 and the output shaft 3210, an pump impeller 3201 at the side of the input shaft, an turbine runner 3202 at the side of the output shaft, and a stator 3205 that has a one-way clutch 3204 and that produces a torque amplifying function. The torque converter 3001 and the transmission 3000 are connected to each other by a rotation shaft. The output shaft rotational speed NT (turbine rotation speed NT) of the torque converter 3001 is detected by a turbine rotational speed sensor. The output shaft rotational speed NOUT of the transmission 3000 is detected by an output shaft rotational speed sensor.

The operation table in FIG. 3 shows for which of the gear steps the individual friction engagement elements, that is, the clutch elements (C1 and C2 in the drawings), the brake elements (B1 to B3) and the one-way clutch element (F), are engaged or released. For example, when the first-gear step (1ST) is used during launching of the vehicle, the transmission 3000 engages the clutch element (C1) and the one-way clutch element (F). Of these clutch elements, the C1 clutch 3640 or the C2 clutch 3650 in particular are called a forward clutch or an input clutch or forward clutch, and the C1 clutch 3640 is always engaged when any of the shift positions other than the park (P) position, a reverse (R) position and a neutral (N) position is selected.

When the progressing (D) position is selected and it is determined that the operational state of the vehicle satisfies a certain condition and the vehicle is at a stop, the transmission 3000 controls the hydraulic circuit to release the C1 clutch 3640, and the C1 clutch 3640 is released to a predetermined semi-released state, thus establishing a nearly neutral state, which is termed "neutral control". The aforementioned certain condition may be, for example, the accelerator pedal is off, the vehicle brake is on, the brake master cylinder pressure is greater than or equal to a predetermined value, and the vehicle speed is less than or equal to a predetermined value, etc.

The ECU 8000 that is a control device in accordance with the embodiment has a feature that neutral state of the friction engagement elements is formed in accordance with a shift of the transmission 3000, before the stop of the vehicle that is before the execution of the neutral control. The neutral state is formed at least a duration that is sufficient to release torsion energy, that is accumulated in the drive transmission system when the vehicle sharply decelerates from a high speed and then stops before the neutral control is executed. This feature will be described hereinafter through the use of a flowchart.

Figure 4:
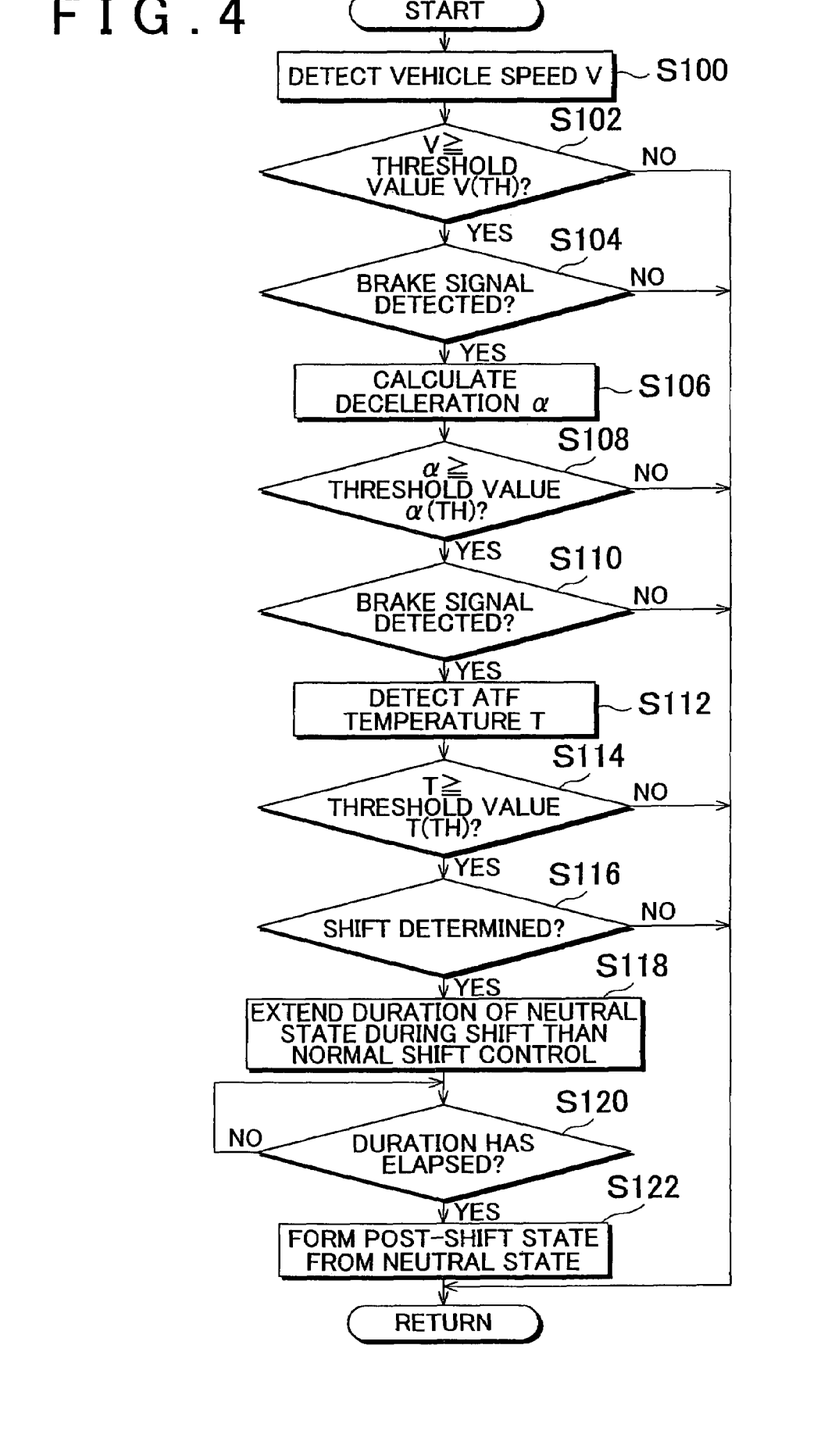
FIG. 4 is a flowchart showing the control structure of the program executed by the ECU, that is the control device of the automatic transmission in accordance with the first embodiment of the invention.

Referring to FIG. 4, the control structure of the program executed by the ECU 8000, that is a control device in accordance with the embodiment, will be described. The program represented by the flowchart is executed in predetermined periods.

In step (hereinafter, abbreviated as "S") 100, the ECU 8000 detects the vehicle speed V. In this step, the ECU 8000 detects the vehicle speed from the rotational speed of the drive shafts 5500 that is the input from the vehicle speed sensor 8002.

In S102, the ECU 8000 determines whether the vehicle speed V is greater than or equal to a threshold value V(TH). The threshold value V(TH) is a threshold value for determining whether the vehicle has undergone a sharp deceleration from high speed, and is set to a speed that the drive transmission system accumulates sufficient torsion energy that cause a shock to the vehicle when released. If the vehicle speed V is greater than or equal to the threshold value V(TH) (YES in S102), the ECU 8000 proceeds to S104. If not (NO in S102), the ECU 8000 ends the process.

In S104, the ECU 8000 determines whether a brake signal has been detected from the vehicle. In this step, the ECU 8000 determines that the brake signal is detected, if the ECU 8000 has received a signal of the on-state from the break light switch 8009 of the brake pedal 8008. If the brake signal is detected (YES in S104), the ECU 8000 proceeds to S106. If not (NO in S104), the ECU 8000 ends the process.

In S106, the ECU 8000 calculates deceleration α of the vehicle. In this step, the ECU 8000 calculates deceleration α, for example, by detecting the vehicle speed V after the detection of the brake signal, and differentiating the vehicle speed V with respect to time. The value which deceleration a takes is a positive value in this description.

In S108, the ECU 8000 determines whether deceleration α of the vehicle is greater than or equal to a threshold value α(TH) (>0). The threshold value α(TH) is a threshold value for determining whether the vehicle has undergone a sharp deceleration from a high speed, and is set to a value that the drive transmission system accumulates sufficient torsion energy that cause a shock to the vehicle when released. If deceleration a of the vehicle is greater than or equal to the threshold value α(TH), that is, if it is a sharp deceleration (YES in S108), the ECU 8000 proceeds to S110. If not, that is, if it is a slow deceleration (NO in S108), the ECU 8000 ends the process.

In S110, the ECU 8000 determines whether the brake signal has been detected from the vehicle. This process is the same as the process in S104. This process determines whether a driver does not have an intention of re-acceleration and has an intention of deceleration. If the ECU 8000 detects the brake signal (YES in S110), the ECU 8000 proceeds to S112. If not (NO in S110), the ECU 8000 ends the process.

In S112, the ECU 8000 detects the ATF temperature T of the transmission 3000. In this step, the ECU 8000 detects the ATF temperature T of the transmission 3000 on the basis of a temperature signal input from the oil temperature sensor 8010.

In S114, the ECU 8000 determines whether the ATF temperature T is greater than or equal to a threshold value T(TH). The threshold value T(TH) is a threshold value for determining whether the present state satisfies a condition for the transmission 3000 to release or semi-release the C1 clutch 3640 to establish the neutral state, and is set as a viscosity in accordance with the temperature of the ATF that has approximately risen to such a level that the C1 clutch 3640 may be promptly released. If the ATF temperature T is greater than or equal to the threshold value T(TH) (YES in S114), the ECU 8000 proceeds to S116. If not (NO in S114), the ECU 8000 ends the process.

In S116, the ECU 8000 detects whether there is a shift determination. This shift determination is made based on whether a shift line prescribed by the vehicle speed V and the accelerator operation amount ACC, for example, whether a shift line in a downshift map, has been crossed. If there is a shift determination (YES in S116), the ECU 8000 proceeds to S118. If not (NO in S116), the ECU 8000 ends the process.

In S118, the ECU 8000 sets a duration of the neutral state of the friction engagement elements in accordance with a shift of the transmission 3000 longer than the normal state, for example, by the transmission 3000 releasing the C1 clutch 3640, or the like. In this step, the ECU 8000 sets a duration of the neutral state that is at least sufficient to release torsion energy. Incidentally, during an ordinary shift, a set duration is not provided or is set at zero or duration close to zero, in order to improve shift response. Furthermore, the neutral state of the friction engagement elements may also be realized by retarding the engagement timing of a clutch or brake that is held in a released state by the transmission 3000 before the shift and that is to be held in the engaged state by the transmission 3000 after the shift, for a set duration.

In S120, the ECU 8000 determines whether the set duration has elapsed during a gear shift of the transmission 3000. More specifically, upon the start of a gear shift of the transmission 3000, for example, the ECU 8000 sends a command signal to the hydraulic circuit of the transmission 3000 to release the C1 clutch 3640. If the C1 clutch 3640 is released, that is, the neutral state of the friction engagement elements is formed, the ECU 8000 begins counting of the length of time of the neutral state, and it determines whether the set duration has elapsed. When the set duration elapses (YES in S120), the ECU 8000 proceeds to S122. If not (NO in S120), the ECU 8000 proceeds to S120, in which the ECU 8000 waits for the set duration to elapse.

In S122, the ECU 8000 sends a command signal to the hydraulic circuit of the transmission 3000 to form the post-shift state from the neutral state of the friction engagement elements.

Operations of a vehicle equipped with the control device in accordance with the embodiment based on the structure and the flowchart described above will be described.

If the vehicle speed V detected in S100 by the ECU 8000 is greater than or equal to the threshold value V(TH) (YES in S102) and deceleration $\alpha$, caused by a decelerating from a high speed, is greater than or equal to the threshold value $\alpha$(TH), the vehicle is undergoing a sharp deceleration from a high speed (YES in S108). In this case, since deceleration $\alpha$ is greater than or equal to the threshold value $\alpha$(TH), sufficient torsion energy, that if the neutral control is executed when the vehicle stops, torsion energy released thereby will likely cause a shock to the vehicle, is accumulated in the drive transmission system.

Therefore, during a shift (YES in S116), the ECU 8000 sets the duration prescribed to form the neutral state of the friction engagement elements in accordance with a shift of the transmission 3000 to a duration that is longer than the normal state. Therefore, the ECU 8000 performs the neutral control at each downshift until the vehicle stops. Since torsion energy accumulated in the drive transmission system is released, the drive transmission system does not accumulate sufficient torsion energy that cause a shock to the vehicle when released. Incidentally, when the ATF temperature is low (NO in S114), the transmission 3000 cannot promptly release the C1 clutch 3640 to form the neutral state of the friction engagement elements due to the delay of the oil pressure response. Therefore, the control of setting the duration of forming the neutral state in accordance with a shift of the transmission 3000 longer than the normal state is not executed.

After the process above, when the condition for the ECU 8000 to start the neutral control, such as the vehicle is at a stop, or the like, is satisfied, the transmission 3000 releases the C1 clutch 3640, and thus the neutral control is executed. The condition to start the neutral control that is the vehicle speed may also include the brake signal, the ATF temperature, or the like.

After the vehicle stops, the neutral control is executed so that the transmission 3000 releases the C1 clutch 3640, and therefore torsion energy of the drive transmission system is released. Since torsion energy has already been released, the accumulated torsion energy that is released in the neutral control is substantially zero or small. Hence, during the neutral control, an occupant in the vehicle will not perceive a shock, and the fuel consumption is improved.

In the conversely case of the above control in which the duration forming the neutral state of the friction engagement elements in accordance with a shift of the transmission 3000 is not extended compared to the normal control, the transmission 3000 allows sufficient torsion energy to accumulate in the drive transmission system, which may cause a shock to the vehicle if released, and torsion energy is not released even after the vehicle stops. Torsion energy is not released until the neutral control is executed after the vehicle stops, so that a shock is caused when torsion energy is released. That is, in the case of an ordinary shift of an automatic transmission, the automatic transmission, unlike the manual transmissions, realizes smooth shifting so that toque is not interrupted during the shift. Since the torque transmission continues, the automatic transmission does not release torsion energy accumulated in the drive transmission system even if a shift is performed. As a result, torsion energy is released only when the vehicle stops and the neutral control is executed, and a shock is caused to the vehicle when torsion energy is released. Also the vehicle stops and the neutral control is started independently of the driver's operation, an occupant is likely to perceive a shock.

According to the ECU 8000 that is the control device of the automatic transmission in accordance with the above embodiment, releases torsion energy accumulated during deceleration by forming a neutral state of the friction engagement elements in accordance with a shift of the transmission 3000, prior to the execution of the neutral control that is executed after the vehicle stops. Torsion energy accumulated during deceleration of the vehicle is released at each time the gear shifts until the vehicle stops. Therefore, an occupant in the vehicle does not perceives a shock caused by the release of torsion energy accumulated in the drive transmission system when the neutral control is executed after the vehicle stops.

Incidentally, ECU 8000 may change the duration of the neutral state of the friction engagement elements based on the magnitude of deceleration $\alpha$. For example, the ECU 8000 may increase the length of the set duration with increasing deceleration $\alpha$, because increased decelerations $\alpha$ involve increased amount of torsion energy accumulated in the drive transmission system.

Furthermore, the transmission 3000 does not need to establish a complete neutral state of the friction engagement elements. As long as it is sufficient for torsion energy accumulated in the drive transmission system to be released, a friction engagement element may be in a semi-released state instead of a completely released state.

A second embodiment of the invention is described hereinafter. The control blocks and the like in this embodiment are the same as those in the first embodiment (FIGS. 1 to 3). Therefore, detailed description thereof is not repeated. In the second embodiment, the ECU 8000 executes a program that is somewhat different from the first embodiment.

Figure 5:
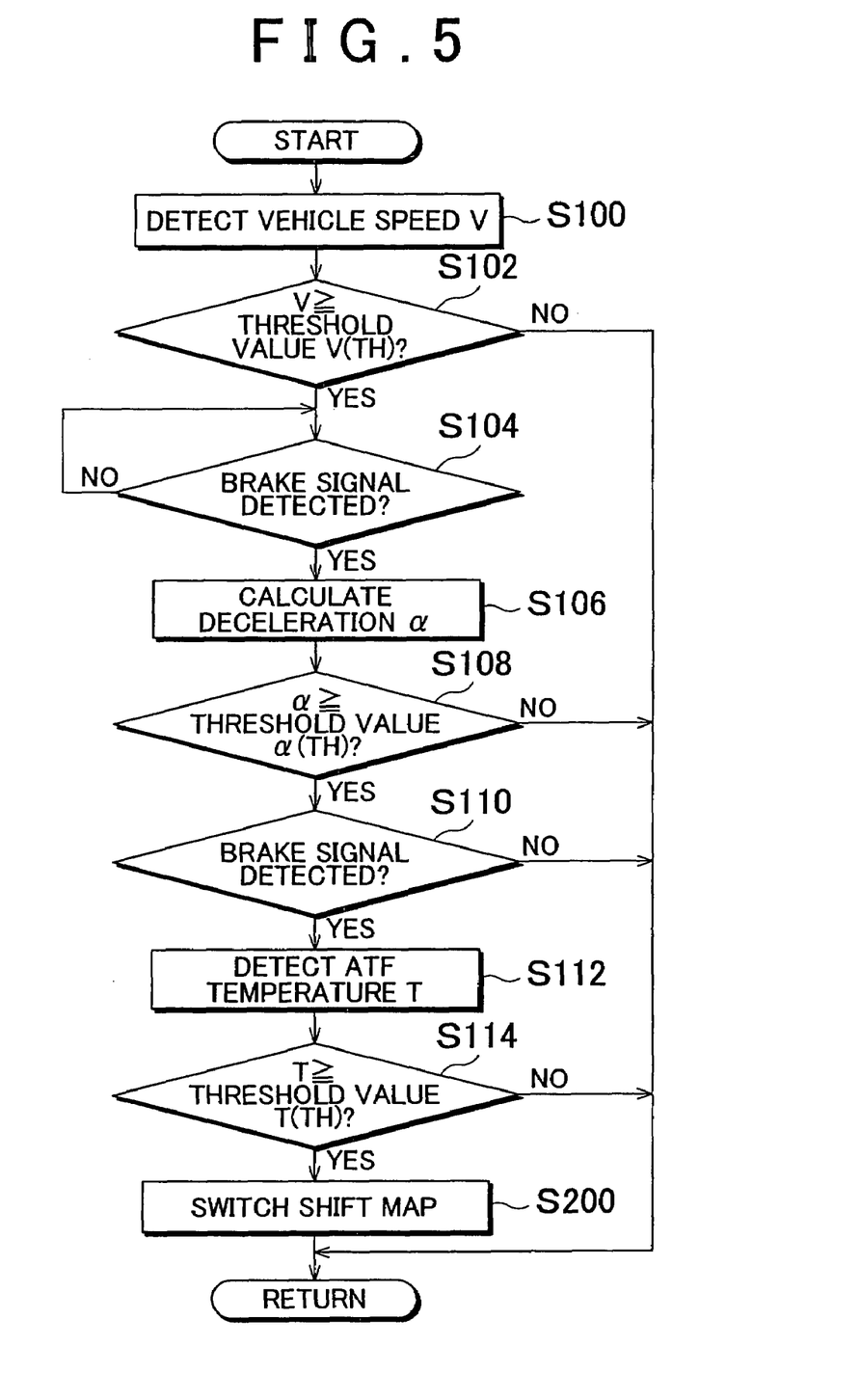
FIG. 5 is a flowchart showing the control structure of the program executed by the ECU that is the control device of the automatic transmission in accordance with the second embodiment of the invention.

FIG. 5 shows a control structure of the program that is executed by the ECU 8000 that is a control device in accordance with the embodiment. The same processes as in the flowchart in FIG. 4 are identified with the same step numbers, and have the same functions as in the flowchart in FIG. 4. Therefore, detailed description thereof will not be repeated.

Figure 6:
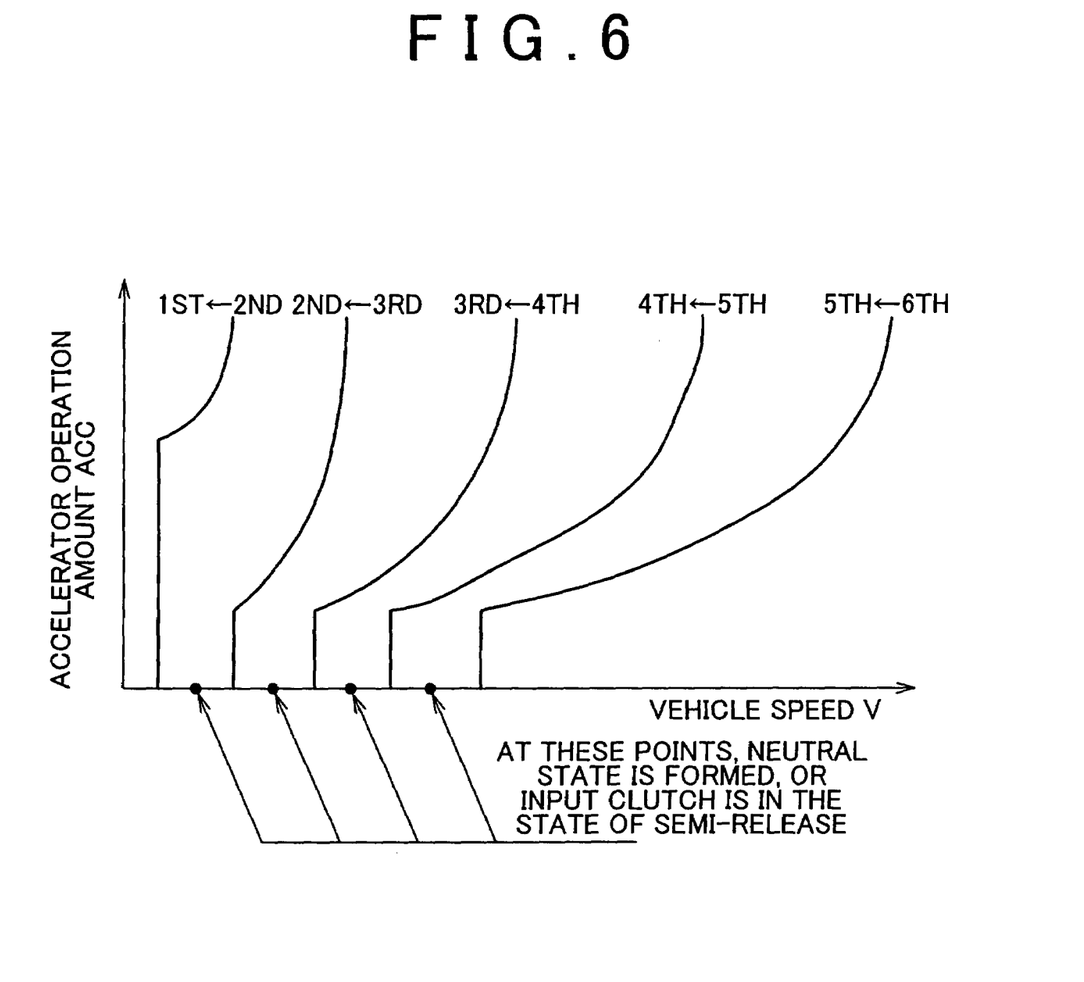
FIG. 6 is a shift map in accordance with the flowchart shown in FIG. 5.

In S200, the ECU 8000 switches a shift map to an energy release-purpose map from an ordinary shift map. As shown in FIG. 6, the energy release-purpose shift map has neutral state formation points (solid dots in FIG. 6) as well as shift points prescribed in the ordinary shift map. At the neutral state formation points, the ECU 8000 releases the C1 clutch 3640, when the vehicle decelerates with the accelerator operation amount ACC being zero, to form a neutral state, or semi-released state. Incidentally, the clutch or friction engagement elements that are released or semi-released are not limited to the C1 clutch 3640.

Hereinafter, operations of a vehicle equipped with the control device in accordance with this embodiment based on the structure and the flowchart described above is described. The same descriptions as those in the first embodiment are not repeated.

If the vehicle speed V is greater than or equal to the threshold value V(TH) (YES in S102) and deceleration $\alpha$ is greater than or equal to the threshold value $\alpha$(TH) (YES in S108), it means that the vehicle is undergoing a sharp deceleration from a high speed (YES in S108). In this case, deceleration from a high speed is of a magnitude such that the drive transmission system accumulates sufficient energy that cause a shock to the vehicle if released when the vehicle stops.

Therefore, in S200, the ECU 8000 switches from the ordinary shift map obtained by removing the solid dots from the map shown in FIG. 6, to the energy release-purpose shift map having the solid dots as shown in FIG. 6. Hence, every time the vehicle speed V reaches any one of the neutral state formation points indicated by the solid dots in FIG. 6 during the coasting-down of the vehicle that is before the vehicle stops, the ECU 8000 executes a control that the friction engagement elements of the C1 clutch 3640 are released or semi-released by the transmission 3000. Each time a neutral state formation point is reached, torsion energy is released, therefore the drive transmission system does not accumulate sufficient torsion energy that cause a shock to the vehicle when released.

After that the process above, when the condition for the ECU 8000 to start the neutral control, such as the vehicle is at a stop, or the like, is satisfied, the transmission 3000 releases the C1 clutch 3640, and thus the neutral control is executed. Thus, if the execution of the neutral control in which the C1 clutch 3640 is released results in the release of torsion energy of the drive transmission system, torsion energy released by this neutral control is substantially zero or small because torsion energy has already been released at the shift points. Therefore, during the neutral control started after the vehicle stops, an occupant in the vehicle does not perceive a shock, and the fuel consumption is improved.

In the conversely case of the above control in which the neutral state of the friction engagement elements is not formed between shifts of the transmission 3000, the transmission 3000 allows sufficient torsion energy to accumulate in the drive transmission system, which may cause a shock to the vehicle if released, and torsion energy is not released even after the vehicle stops. Torsion energy is not released until the neutral control is executed after the vehicle stops, so that a shock is caused when torsion energy is released. That is, in the case of an ordinary shift of an automatic transmission, the automatic transmission unlike the manual transmissions, realizes smooth shifting so that toque is not interrupted during the shift. Since the torque transmission continues, the automatic transmission does not release torsion energy accumulated in the drive transmission system even if a shift is performed. As a result, torsion energy is released only when the vehicle stops and the neutral control is executed, and a shock is caused to the vehicle when torsion energy is released.

According to the ECU 8000 that is the control device of the automatic transmission in accordance with the above embodiment, releases torsion energy accumulated during deceleration by changing shift maps, and forming neutral states of the friction engagement elements by releasing or semi-releasing a friction engagement element at neutral state formation points which are set between the shift lines, prior to the neutral control that is executed after the vehicle stops. Torsion energy accumulated during deceleration is released at each time a neutral state formation point is reached until the neutral control is executed by the ECU 8000 after the vehicle stops. Therefore, an occupant in the vehicle does not perceives a shock caused by the release of torsion energy accumulated in the drive transmission system when the neutral control is executed after the vehicle stops.

The embodiments described herein are merely illustrative and not restrictive. The scope of the invention is shown not by the foregoing description but by the claims, and is intended to cover all modifications within the meaning and scope equivalent to the claims.

What is claimed is:

1. A control device for an automatic transmission having an engagement element that is engaged and released to switch a state of power between an engine and a drive wheel that are mounted in a vehicle, between a transmitted state and a non-transmitted state, comprising:

neutral control means that controls the automatic transmission so as to execute a neutral control to release the engagement element if a progressing position of the automatic transmission is selected, and a state of the vehicle satisfies a certain condition;

detection means that detects degree of deceleration of the vehicle before the neutral control is executed; and control means that releases the engagement element to be in a released or semi-released state in accordance with a shift of the automatic transmission if the degree of deceleration is greater than a predetermined degree, wherein the control means includes means that keeps the engagement element in the released or semi-released state for a predetermined duration during a shift of the automatic transmission.

2. The control device for the automatic transmission according to claim 1, wherein the control means includes means that keeps the engagement element in the released or semi-released state for a period of time that is set longer if the degree of deceleration is greater.

3. A control device for an automatic transmission having an engagement element that it engaged and released to switch a state of power between an engine and a drive wheel that are mounted in a vehicle, between a transmitted state and a non-transmitted state, comprising:

neutral control means that controls the automatic transmission so as to execute a neutral control to release the engagement element if a progressing position of the automatic transmission is selected, and a state of the vehicle satisfies a certain condition;

detection means that detects degree of deceleration of the vehicle before the neutral control is executed;

control means that releases the engagement element to be in a released or semi-released state in accordance with a shift of the automatic transmission if the degree of deceleration is greater than a predetermined degree; and storage means that stores a plurality of shift maps prescribed by vehicle speed and accelerator operation amount, wherein the control means includes means that switches the shift map from one of the plurality of shift maps in which there is not a shift point, at which the engagement element is released to be in the released or semi-released state, between shift lines to another one of the plurality of shift maps in which there is such a shift point between the shift lines if the degree of deceleration is greater than the predetermined degree.

4. The control device for the automatic transmission according to claim 1, wherein the vehicle is a rear-wheel drive vehicle having a drive transmission system that includes a propeller shaft, and wherein the predetermined degree of deceleration is such a degree of deceleration that if torsion energy accumulated in the drive transmission system due to the deceleration of the vehicle is released, an occupant of the vehicle perceives a shock.

5. The control device for the automatic transmission according to claim 3, wherein the vehicle is a rear-wheel drive vehicle having a drive transmission system that includes a propeller shaft, and wherein the predetermined degree of deceleration is such a degree of deceleration that if torsion energy accumulated in the drive transmission system due to the deceleration of the vehicle is released, an occupant of the vehicle perceives a shock.

6. The control device for the automatic transmission according to claim 2, wherein the vehicle is a rear-wheel drive vehicle having a drive transmission system that includes a propeller shaft, and wherein the predetermined degree of deceleration is such a degree of deceleration that if torsion energy accumulated in the drive transmission system due to the deceleration of the vehicle is released, an occupant of the vehicle receives a shock.

* * * * *